United States Patent Office 3,660,535
Patented May 2, 1972

3,660,535
PROCESS FOR THE PRODUCTION OF ALKENYL AROMATIC POLYMERS CONTAINING A REINFORCING POLYMER THEREIN
Charles R. Finch and Jerold E. Kuntzsch, Midland, Mich., assignors to The Dow Chemical Company, Midland, Mich.
No Drawing. Continuation-in-part of application Ser. No. 848,708, Aug. 8, 1969. This application Sept. 23, 1970, Ser. No. 74,846
Int. Cl. C08f 15/04
U.S. Cl. 260—880             12 Claims

ABSTRACT OF THE DISCLOSURE

In a stratifying polymerization method for the preparation of styrene-type polymers polymerized in the presence of a reinforcing agent such as rubber, substantial control of the characteristics of the end product as well as particle size of the rubber is obtained by employing varying degrees of recirculation in an initial stage of a continuous polymerization.

This application is a continuation-in-part of our earlier filed application Ser. No. 848,708, filed Aug. 8, 1969, now abandoned.

This invention relates to the preparation of impact-type styrene polymers wherein such polymers are prepared by the polymerization of a styrene-type monomer in the presence of a rubber in a stratifying polymerizer.

Conveniently, styrene-type polymers are prepared employing a mass system; that is, a system that is primarily polymer and monomer, and optionally up to about 20 percent of a diluent which is a solvent for the polymer produced. One mass polymerization system which is particularly beneficial for the preparation of styrene-type polymers is a multi-stage stratifying-type polymer which, for purposes of illustration, can be visualized as an elongate reactor or two or more elongate reactors, series connected, wherein the monomeric material is introduced at the inlet and discharged from the outlet. When the reactor consists of a plurality of vessels series connected, the monomeric material is fed to the inlet of the first vessel and the reaction mixture discharged therefrom after being partially converted to polymer and sequentially passed to one or more generally similar vessels wherein the material is fed in at the inlet and removed at the outlet of the vessels. By employing a plurality of vessels, conveniently, various temperatures are readily utilized to complete polymerization to a desired degree. A single elongate reactor may be employed, but for mechanical and operating convenience, a plurality of vessels are usually employed. Molecular weight and rate of polymerization control are obtainable by temperature variations. In the preparation of polymers such as polystyrene, such a polymerizer may consist of two or more unagitated reactors. However, for the preparation of reinforced polymers, such as a rubber reinforced polystyrene, agitation in the early stages is highly desirable where the feed to the reactor consists of a solution of a reinforcing agent such as a polybutadiene rubber in styrene monomer. Depending upon the variety of rubber, a minor amount of agitation is found desirable in order to cause separation of the rubber into monomer-swollen small particles within a styrene-monomer-polymer matrix. U.S. Pat. 2,694,692 describes the desirability and criticality of agitation in the early stages of the polymerization of impact materials, and the teaching of U.S. 2,694,692 is herewith incorporated by reference. Usually, the greater the degree of agitation, the smaller the rubber particles become and heat transfer is improved. Various polymerization mechanisms have been proposed, and if agitation is provided at the location within the reactor wherein a critical amount of conversion of monomer to polymer has taken place, a useful impact resin is obtained wherein the rubber is present as discrete particles within the polymer matrix. Such particles do not appear to be rubber alone but often contain discrete occlusions of polystyrene within the particles. The size of the resultant so-called rubber particles is often critical to certain end use applications. Generally speaking, for a given rubber polymerized employing identical temperature schedules, variation in the rubber particle size results in variation in the impact resistance of the polymer, its moldability and extrudability. Surface appearance of parts formed from the polymer and other variations in characteristics are extremely significant to a manufacturer employing the impact material in the fabrication of useful components. For example: in some applications, surface gloss may have relatively little significance, whereas impact strength is the most important factor. In other applications, the impact strength may be of secondary consideration and high gloss and ready moldability may be desirable. Thus, for what may be considered as a single composition; that is, one containing X percent polymerized styrene and Y percent of a particular grade of rubber, different uses may require a material having different physical properties which are related to the apparent particle size and particle structure (i.e., polymer inclusions within the rubber particle) of the rubber. Oftentimes it is desirable to polymerize an impact grade polymer; that is, one containing rubber, in different polymerization apparatus. Minor variations from polymerization unit to polymerization unit may well lead to products which, for commercial purposes, are vastly different from each other although apparently having the same chemical composition. Thus, the manufacture of such impact polymers and maintaining consistent quality and reproducibility of various types of a material prepared from the same starting materials and oftentimes polymerized using the same temperature schedule, often presents a substantial problem. Manufacturer A may have requirements substantially different than manufacturer B in an impact resin of identical rubber content. Suitable polymerization conditions for a desired resin grade may be determined in one polymerization apparatus. Yet, when a similar resin employing substantially identical feed stock and temperature conditions is employed in a different but very similar, or even at times in what is supposed to be an identical reactor, the product is unlike the desired product; that is, the rubber particle size and/or structure in the resultant product may be too large or too small or simply different. Because of the diverse and changing requirements for impact polymers, generally it is impractical to manufacture all of the product desired in one reactor or to maintain one polymerization reactor to prepare polymer for each requirement. A polymerization apparatus for a given period of time may make a resin of grade X. At the end of this period, conditions are altered to manufacture a resin of grade Y having identical starting materials (both in composition and quantity) to those used in the manufacture of grade X resin. If it is desired to manufacture a further amount of grade X resin before the desired amount of grade Y resin has been manufactured, it is often highly desirable to employ a different reaction apparatus possibly at a different location to provide the desired product. Oftentimes great difficulty is encountered due to minor variations in what is supposedly identical rubber and supposedly identical reactors in obtaining the desired end product. Frequently, substantial experimentation must be done. The loss of very significant quantities of material, manpower and production capability are required to adjust to conditions in the stratifying polymerizer to provide the desired grade of resin.

It would be particularly advantageous if there were available an improved method for the control of product quality in a stratifying polymerizer producing impact resins.

It would also be particularly desirable if there were an improved manner of operating a stratifying continuous polymerizer in the manufacture of impact grade polystyrene which would permit obtaining the desired variety of product with minimal adjustment.

It would be further desirable if there were available an improved method for the preparation of stratifying polymerizers in the preparation of styrene-type impact resins which would permit ready control of the apparent rubber particle size in the finished polymer.

These benefits and other advantages in accordance with the present invention are achieved in a method for the preparation of an impact styrene-type polymer, the method comprising passing to a reaction zone, such as a first reaction zone, of a stratifying-type polymerizer comprising an elongate reactor having a plurality of sequentially arranged reaction zones, a feed stream comprising a solution of a rubbery reinforcing agent in polymerizable alkenyl aromatic monomer, polymerizing the monomer to a conversion sufficient to cause the rubbery reinforcing agent to appear as an apparent separate phase, agitating the polymerizing mixture to cause the apparent separate phase to form a plurality of particles disposed in a monomer-polymer phase caused by the polymerization of the feed stream (phase inversion), subsequently passing a partially polymerized stream to a subsequent or second reaction zone and generally completing polymerization of the monomer, the improvement which comprises removing a portion of the partially polymerized feed stream from a location in the polymerizer subsequent to phase inversion, and introducing said removed portion into the feed stream at a location prior to phase inversion, maintaining the rate of removal and the introduction at a rate sufficient to provide a desired apparent rubber particle size in the stream leaving the first reaction zone. Such reinforced resinous systems are well known and many are described in U.S. Pat. 2,694,692, herewith incorporated by reference.

The present invention is particularly suited for the polymerization of alkenyl aromatic monomers. By the term "alkenyl aromatic monomer" is meant an alkenyl aromatic compound having the general formula

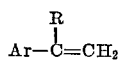

wherein Ar represents an aromatic hydrocarbon radical, or an aromatic halohydrocarbon radical of the benzene series, and R is hydrogen or the methyl radical. Examples of such alkenyl aromatic monomers are styrene, alpha-methyl styrene, o-methylstyrene, m-methylstyrene, p-methylstyrene, ar-ethylstyrene, ar-vinylxylene, ar-chlorostyrene or ar-bromostyrene and the like, which have dissolved or dispersed therein rubbers such as polybutadiene rubber, either of the stereospecific or non-stereospecific variety, block copolymers of styrene and butadiene and like rubbers or polymeric materials employed for increasing the impact resistance of styrene polymers. Such polymerizations may be catalyzed or uncatalyzed and conducted under conventional temperatures and conditions and are readily controlled as to the particle size of the rubber in accordance with the present invention.

Stratifying polymerizers which are useful in the method of the present invention are generally elongated vessels connected in series wherein the solids level increases as the material proceeds from the inlet end to the discharge end. Such stratifying polymerizers usually have a length to diameter ratio of at least about 4:1 and oftentimes 6:1, 10:1 or even greater. Usually, such stratifying polymerizers are provided with an agitator in at least the first polymerization stage or reaction zone in order to cause the desired separation of the rubbery polystyrene graft polymer into a plurality of individual particles rather than a continuous gel. For heat transfer purposes and maintaining more or less plug flow, it is generally beneficial to provide agitation in the remaining portions of the polymerizer.

In the practice of the present invention, a solution of the desired rubber and monomer are fed to one end of the first stage reactor and removed from the second end, passed to a subsequent stage or stages to obtain the desired degree of polymerization. Generally in order to provide desired control of the rubber particle size and the processing characteristics of the ultimate polymer, a portion of the partially polymerized stream (at a degree of conversion where the rubber particles have formed or after phase inversion) is recirculated to a location generally adjacent the inlet of the first stage. Such recirculation may vary from 5 to several hundred percent of the feed rate of the monomer stream. By varying agitation and recirculation of the reaction mixture, variations of rubber particle size and/or structure at the phase inversion point is readily achieved and the physical properties of resultant polymer varied accordingly.

It is essential and critical to the operation of the present invention that the solids level increase at the inlet of the reactor be maintained from ½ to 30 percent, beneficially 1 percent and more beneficially 2 to 20 percent, and advantageously 2 to 15 percent, greater than the solids level normally present when a polymerization apparatus is operated without recirculation. For example: in the preparation of an impact polystyrene composition, a rubber solution in monomer may be provided to the first agitated stage of a polymerization train, the monomer stream containing approximately 5.5 percent dissolved rubber, the first stage of the polymerization apparatus having a length to diameter ratio of about 4:1. Usually, the solids as measured at the top of the reactor will vary from about 6 to 7 weight percent, depending upon the speed of the agitator, temperature, reactor geometry and the like. Although the stream for recirculation may be taken from almost any portion of the reaction apparatus lying between the outlet end and the inlet end, generally it is convenient to recirculate a stream containing from about 20 to 50 percent by weight solids (including rubber), and most beneficially, from about 20 to about 38 weight percent solids. In general, as the solids content and/or amount of material recirculated increases, the particle size of the rubber increases as does the particle size distribution. Usually it is desirable that the solids level in the recirculated stream be maintained below 50 weight percent, and preferably 38 weight percent, to avoid excessively wide particle size distribution and undesirably large particles. Usually it is beneficial to employ lower solids material and a high rate of recirculation to obtain improved heat transfer in the portion of the reactor included in the recirculation loop. The improved heat transfer obtained with recirculation advantageously increases the maximum polymerization rate of the reactor.

The following examples illustrate the manner in which the principles of the invention are applied but are not to be construed as limiting the scope of the invention.

EXAMPLE 1

A three stage continuous stratifying polymerizer is employed wherein the volume ratio of the reactors for the first, second and third stages have capacities of 45 pounds, 45 pounds and 120 pounds; lengths of 48 inches, 48 inches and 30 inches and diameters of 6 inches, 6 inches and 12 inches, respectively. A feed solution is prepared containing 5.3 weight percent of a polybutadiene rubber commercially available under the trade designation of "Diene 55" having a cis-1,4 content of about 40 percent, 1 weight percent mineral oil, 0.15 weight percent alpha-methylstyrene dimer, 6 weight percent ethylbenzene, the remainder being monomeric styrene. The reaction mixture in the first vessel is maintained at about 115° C. at the inlet and about 130° C. at the outlet; the second vessel at about 130° C. at the inlet and 137° C. at the outlet, and the third vessel at about 140° C. at the inlet and 165° C. at the outlet. Each vessel is agitated at speeds of about 70 to 130, 70 and 10 revolutions per minute, respectively. The feed is provided to the input of the first reaction vessel at a rate of about 25 pounds per hour. A positive displacement gear pump is connected from the outlet of the first stage to the inlet of the first stage and a series of polymerization runs are made at varying amounts of recirculation provided by varying the speed of the pump. The results are set forth in Table I. For convenience, the first reactor vessel is sampled adjacent the top or inlet and the effluent is also sampled and the amount of solids determined (polymerized styrene plus rubber), together with the particle size of the completely polymerized effluent from the third stage. The particle size of the rubber in the effluent from the third stage closely correlates with the particle size observed at the outlet of the first stage reactor.

TABLE I.—FIRST STAGE RECIRCULATION

| Run | Percent polystyrene top | Percent polystyrene bottom | Particle size (microns) |
| --- | --- | --- | --- |
| Agitator speed (1st vessel) 100 r.p.m.[1] | | | |
| 1 | 0 | 25 | 3.2 |
| 2 | 0 | 32 | 4.5 |
| 3 | 7.3 | 23 | 4.5 |
| 4 | 9.5 | 20 | 4.0 |
| 5 | 9.5 | 29.5 | 4.9 |
| 6 | 13.3 | 21 | 6.7 |
| 7 | 14.5 | 30 | 6.6 |
| 8 | 16 | 25 | 12.5 |
| 9 | 18 | 28 | 13 |
| Agitator speed (1st vessel) 85 r.p.m.[1] | | | |
| 10 | 0 | 25 | 3.7 |
| 11 | 0 | 31 | 4.7 |
| 12 | 9.5 | 20 | 4.7 |
| 13 | 1.45 | 30 | 7.9 |
| Agitator speed (1st vessel) 70 r.p.m.[1] | | | |
| 14 | 0 | 21 | 3.7 |
| 15 | 0 | 31 | 5.3 |
| 16 | 9.0 | 28 | 5.9 |
| 17 | 9.5 | 21 | 5.8 |
| 18 | 14 | 29 | 7.9 |

[1] Revolutions per minute.

EXAMPLE 2

In a manner similar to Example 1, with the exception that the polymerizer comprises a first reactor 13.5 feet in length and 3 feet in diameter, a second reactor having a length of 13.5 feet and a diameter of 3 feet and a third reactor having a length of 12.5 feet and a diameter of 4.5 feet, the first, second and third stages are operated with inlet and outlet temperatures of about 120–135° C., 135–145° C. and 145–170° C., respectively. The first stage is provided with an elongated agitator running the entire length of the reactor. A positive displacement gear pump is connected between the inlet of the first stage and its outlet to recirculate material from the effluent stream to the inlet stream at a predetermined rate. The feed stock is that of Example 1. The results are set forth in Table II. The particle size of the effluent from the third stage reactor is generally identical to the particle size observed at the outlet of the first stage reactor.

TABLE II

| Run | Percent polystyrene, top | Percent polystyrene, bottom | Particle size (microns) |
| --- | --- | --- | --- |
| Agitator speed (1st vessel) 23 r.p.m.[1] | | | |
| 19 | 1 | 19 | 3.5 |
| 20 | 7 | 19 | 4.3 |
| 21 | 9 | 18 | 5.0 |
| 22 | 11 | 19 | 6.0 |
| 23 | 13.5 | 20 | 6.5 |
| Agitator speed (1st vessel) 29 r.p.m.[1] | | | |
| 24 | 1 | 18 | 3.0 |
| 25 | 9 | 20 | 4.5 |
| 26 | 12 | 19 | 5.0 |
| Agitator speed (1st vessel) 35 r.p.m.[1] | | | |
| 27 | 1 | 20 | 2.5 |
| 28 | 9 | 19 | 3.5 |
| 29 | 12 | 20 | 4.5 |

[1] Revolutions per minute.

EXAMPLE 3

In a manner similar to Example 1, with the exception that the polymerizer comprises a first reactor 40 inches in length and 8 inches in diameter and a second reactor having a length of 30 inches and a diameter of 12 inches, the first and second stages are operated at inlet and outlet temperatures of about 120–135° C. and 138–170° C., respectively. The first stage is provided with an elongated agitator running the entire length of the reactor. A positive displacement gear pump is connected between the inlet of the first stage and its outlet to recirculate material from the effluent stream to the inlet stream at a predetermined rate. The feed stock is similar to that of Example 1 with the exception that 7.5 percent of a 30 parts by weight styrene, 70 parts by weight polybutadiene block copolymer having an inherent viscosity of 1.5 centiposises is employed. The results are set forth in Table III. The particle size of the effluent from the third stage reactor is generally identical to the particle size observed at the outlet of the first stage reactor.

TABLE III

| Percent polystyrene at top of 1st stage | R.p.m.[1] | Microgel, percent | Particle size [2] | Izod impact |
| --- | --- | --- | --- | --- |
| 3 | 40 | 14.8 | 0.5–1.5 | 0.87 |
| 4 | 80 | 18.6 | 1.0–2.0 | 0.81 |
| 12 | 60 | 22.1 | 1.0–2.5 | 1.14 |
| 16 | 80 | 24.6 | 1.5–3.0 | 1.01 |

[1] Revolutions per minute.
[2] Microns.

EXAMPLE 4

In a manner similar to Example 1, with the exception that the polymerizer comprises a first reactor 48 inches in length and 6 inches in diameter, a second reactor having a length of 40 inches and a diameter of 8 inches and a third reactor having a length of 30 inches and a diameter of 12 inches, and respective capacities of 45 pounds, 60 pounds and 120 pounds, the first, second and third stages are operated at inlet and outlet temperatures of about 115–130° C., 130–140° C. and 140–170° C., respectively. The first stage is provided with an elongated agitator running the entire length of the reactor. A positive displacement gear pump is connected between the inlet of the first stage and its outlet to recirculate material from the effluent stream to the inlet stream at a predetermined rate. A feed stock is supplied to the inlet of the first reactor, the feed stock containing 7.5 percent of a 30 parts by weight styrene, 70 parts by weight butadiene block copolymer, 6 weight percent acrylonitrile, 0.5 weight percent mineral oil, 6 weight percent ethylbenzene and the remainder monomeric styrene. Eleven percent acrylonitrile is added to the inlet of the second reactor. The results are set forth in Table IV. The particle size of the effluent from the third stage reactor is generally identical to the particle size observed at the outlet of the first stage reactor.

TABLE IV

| Run | Percent styrene polymer, top | Percent styrene polymer, bottom | Particle size (microns) |
|---|---|---|---|
| Agitator speed (1st vessel) 80 r.p.m.[1] | | | |
| 30 | 2 | 24 | 1.0 |
| 31 | 11 | 23 | 2.5 |

[1] Revolutions per minute.

In a manner similar to the foregoing illustrations, the hereinbefore set forth styrene-type monomers may be polymerized with rubber and comonomers to prepare styrene-type impact resins.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention except as set forth and defined in the hereto appended claims.

What is claimed is:

1. A method for the preparation of an impact-type styrene polymer, the method comprising
    passing to a first reaction zone of a stratifying-type polymerizer comprising an elongate reactor having a plurality of reaction zones, a feed stream comprising a solution of a rubber reinforcing agent in a polymerizable alkenyl aromatic monomer,
    polymerizing the monomer to a conversion sufficient to cause the rubbery reinforcing agent to appear as an apparent separate phase,
    agitating the polymerizing mixture to cause the apparent separate phase to form a plurality of particles disposed in a monomer-polymer phase caused by the polymerization of the feed stream, subsequently
    passing a partially polymerized stream to a second reaction zone and generally completing polymerization of the monomer, the improvement which comprises
        removing a portion of the partially polymerized feed stream from a location of the first reaction zone subsequent to phase inversion and
        introducing said removed portion into the feed stream at a location prior to phase inversion,
        maintaining the rate of removal and introduction at a rate sufficient to provide a desired apparent rubber particle size in the stream leaving the first reaction zone.

2. The method of claim 1 wherein the feed stream comprises a solution of rubber in styrene.

3. The method of claim 1 wherein the feed stream comprises a solution of rubber in a mixture of styrene and acrylonitrile.

4. The method of claim 1 wherein the solids level adjacent the inlet of the first reaction zone are maintained at a level of at least 0.5 percent greater than the solids level without recirculation.

5. The method of claim 1 wherein the solids level adjacent the inlet of the first stream is at least one percent greater than the solids level without recirculation.

6. The method of claim 1 wherein the solids level adjacent the inlet of the first stream is at least two percent greater than the solids level without recirculation.

7. The method of claim 1 wherein the recirculated stream contains from about 20 to 50 percent by weight solids.

8. The method of claim 1 wherein the recirculated stream contains from about 20 to 38 percent by weight solids.

9. The method of claim 1 wherein the reactor is a plurality of elongate vessels.

10. The method of claim 1 wherein the elongate vessels are agitated.

11. A method for the preparation of impact styrene polymer; that is, a polymer of styrene polymerized in the presence of rubber, the steps of the method comprising
    providing a feed stream, the feed stream being a solution of a rubber in styrene monomer,
    passing the feed stream to a stratifying-type polymerizer which comprises an elongate reactor having a plurality of reaction zones,
    polymerizing the styrene until the solids content of the styrene is from about 20 to 38 weight percent,
    agitating the feed stream during polymerization to cause an apparent separate phase of rubber particles dispersed within the styrene-polystyrene monomer phase,
    passing the partially polymerized feed stream to a second reaction zone and generally completing polymerization of the styrene, the improvement which comprises
        removing a portion of the partially polymerized feed stream from a location wherein the solids content is from about 20 to 38 weight percent,
        returning a portion of the feed stream to a location adjacent the inlet of the reactor and at a location prior to the formation of the apparent separate phase, and
        maintaining the rate of removal and introduction at a rate sufficient to provide a desired apparent rubber particle size.

12. A method for the preparation of an impact-type styrene polymer, the method comprising
    passing to a stratifying-type polymerizer comprising an elongate reactor having a plurality of sequentially arranged reaction zones, a feed stream comprising a solution of a rubber reinforcing agent in a polymerizable alkenyl aromatic monomer,
    polymerizing the monomer to a conversion sufficient to cause the rubbery reinforcing agent to appear as an apparent separate phase,
    agitating the polymerizing mixture to cause the apparent separate phase to form a plurality of particles disposed in a monomer-polymer phase caused by the polymerization of the feed stream, subsequently
    passing a partially polymerized stream to a subsequent reaction zone and generally completing polymerization of the monomer, the improvement which comprises
        removing a portion of the partially polymerized feed stream subsequent to phase inversion and
        introducing said removed portion into the feed stream at a location prior to phase inversion,
        maintaining the rate of removal and introduction at a rate sufficient to provide a desired apparent rubber particle size in the partially polymerized stream.

References Cited

UNITED STATES PATENTS

| | | | |
|---|---|---|---|
| 2,877,200 | 3/1959 | Carpenter | 260—33.6 |
| 3,449,472 | 6/1969 | Coover et al. | 260—880 |
| 3,488,743 | 1/1970 | Baer et al. | 260—879 |
| 3,458,467 | 7/1969 | Herrle et al. | 260—29.6 |

JOSEPH L. SCHOFER, Primary Examiner

R. A. GAITHER, Assistant Examiner

U.S. Cl. X.R.

260—879

PO-1050
(5/69)

UNITED STATES PATENT OFFICE
CERTIFICATE OF CORRECTION

Patent No. 3,660,535                    Dated  2 May 1972

Inventor(s)   Charles R. Finch and Jerold E. Kuntzsch

It is certified that error appears in the above-identified patent and that said Letters Patent are hereby corrected as shown below:

Column 5, line 46 (Table I, first column following Run 13), delete "1.45" and insert --14.5--.

Column 6, line 36 delete "-tiposises" and insert -- -tipoise--.

Column 6, Table III, last line of the last column, delete "1.01" and insert --1.10--.

Column 7, line 43, delete "of" and insert --in--.

Signed and sealed this 21st day of November 1972.

(SEAL)
Attest:

EDWARD M.FLETCHER,JR.
Attesting Officer

ROBERT GOTTSCHALK
Commissioner of Patents